US010748086B2

(12) United States Patent
Clark et al.

(10) Patent No.: US 10,748,086 B2
(45) Date of Patent: Aug. 18, 2020

(54) SYSTEMS AND METHODS FOR FACILITATING EVENT ACCESS THROUGH PAYMENT ACCOUNTS

(71) Applicant: MASTERCARD INTERNATIONAL INCORPORATED, Purchase, NY (US)

(72) Inventors: Kyle P. Clark, High Ridge, MO (US); Joel Chris Wheeler, Ballwin, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 871 days.

(21) Appl. No.: 15/334,665

(22) Filed: Oct. 26, 2016

(65) Prior Publication Data
US 2017/0255934 A1 Sep. 7, 2017

Related U.S. Application Data

(63) Continuation-in-part of application No. 15/062,635, filed on Mar. 7, 2016.

(51) Int. Cl.
G06Q 10/02 (2012.01)
G07F 17/42 (2006.01)
(Continued)

(52) U.S. Cl.
CPC ........... G06Q 10/02 (2013.01); G06Q 20/346 (2013.01); G06Q 20/405 (2013.01); G07B 15/00 (2013.01); G07F 17/42 (2013.01)

(58) Field of Classification Search
CPC .... G06Q 20/405; G06Q 20/346; G06Q 10/02; G06Q 20/204; G06Q 20/407; G07B 15/00; G07F 17/42
(Continued)

(56) References Cited

U.S. PATENT DOCUMENTS 6,128,601 A 10/2000 Van Horne et al.
6,738,750 B2 5/2004 Stone et al.
(Continued)

FOREIGN PATENT DOCUMENTS

EP 1335310 8/2003
EP 2911097 8/2015
(Continued)

OTHER PUBLICATIONS

Ticketmaster, "Ticket Master Credit Card Entry"/ available at https://www.ticketmaster.com/creditcardentry, accessed via internet archive (Year: 2013).*
(Continued)

Primary Examiner — Kevin H Flynn
Assistant Examiner — Emmett K. Walsh
(74) Attorney, Agent, or Firm — Harness, Dickey & Pierce, P.L.C.

(57) ABSTRACT

Exemplary systems and methods for linking access credentials with payment accounts and facilitating access to events based on associations between the payment accounts and the events are disclosed. One exemplary method includes receiving, at a computing device, an authorization request for purchasing access to an event where the authorization request includes event content, ticket content, and payment content, and where the authorization request is associated with a merchant. The method also includes determining, at the computing device, whether the merchant and/or the event are registered, and when the merchant and the event are registered, storing, in memory of the computing device, a link between a payment account identified in the payment content and the event, whereby the link is able to be retrieved, by the merchant, via a subsequent authorization request, to indicate access to the event.

21 Claims, 5 Drawing Sheets

(51) Int. Cl.
*G07B 15/00* (2011.01)
*G06Q 20/34* (2012.01)
*G06Q 20/40* (2012.01)

(58) Field of Classification Search
USPC .................................................. 705/5
See application file for complete search history.

(56) References Cited

U.S. PATENT DOCUMENTS

| | | | |
|---|---|---|---|
| 7,376,839 B2 | 5/2008 | Carta et al. | |
| 7,527,208 B2 | 5/2009 | Hammad et al. | |
| 7,631,803 B2 | 12/2009 | Peyret et al. | |
| 7,778,935 B2 | 8/2010 | Colella | |
| 8,688,554 B2 | 4/2014 | Hammad et al. | |
| 8,733,663 B2 | 5/2014 | Hammad et al. | |
| 8,738,485 B2 | 5/2014 | Dixon et al. | |
| 9,118,656 B2 | 8/2015 | Ting et al. | |
| 2003/0028814 A1 | 2/2003 | Carta et al. | |
| 2004/0006497 A1 | 1/2004 | Nestor et al. | |
| 2004/0164143 A1 | 8/2004 | Haley | |
| 2004/0215963 A1 | 10/2004 | Kaplan | |
| 2006/0020517 A1 | 1/2006 | Brooks et al. | |
| 2006/0059365 A1 | 3/2006 | Harper | |
| 2007/0017976 A1 | 1/2007 | Peyret et al. | |
| 2007/0051797 A1* | 3/2007 | Randolph-Wall | G06Q 20/10 235/381 |
| 2007/0186106 A1 | 8/2007 | Ting et al. | |
| 2007/0214093 A1 | 9/2007 | Colella | |
| 2009/0171682 A1 | 7/2009 | Dixon et al. | |
| 2009/0184163 A1 | 7/2009 | Hammad et al. | |
| 2010/0082374 A1 | 4/2010 | Charania et al. | |
| 2010/0228576 A1* | 9/2010 | Marti | G06Q 10/02 705/5 |
| 2010/0320268 A1 | 12/2010 | Brooks et al. | |
| 2011/0119098 A1 | 5/2011 | Miller et al. | |
| 2012/0032782 A1 | 2/2012 | Colella | |
| 2012/0036073 A1 | 2/2012 | Basu et al. | |
| 2012/0185394 A1 | 7/2012 | Gelfand et al. | |
| 2013/0008958 A1 | 1/2013 | Smith et al. | |
| 2013/0151292 A1 | 6/2013 | Van Deloo et al. | |
| 2013/0179201 A1 | 7/2013 | Fuerstenberg et al. | |
| 2014/0149293 A1 | 5/2014 | Laracey | |
| 2014/0192197 A1 | 7/2014 | Hanko et al. | |
| 2014/0372308 A1 | 12/2014 | Sheets | |
| 2015/0269559 A1* | 9/2015 | Inotay | G06Q 20/3274 705/44 |
| 2015/0327072 A1 | 11/2015 | Powell et al. | |

FOREIGN PATENT DOCUMENTS

| | | | |
|---|---|---|---|
| WO | WO01/84504 | 11/2001 | |
| WO | WO-0184504 A2 * | 11/2001 | G06Q 10/02 |
| WO | WO2008/070781 | 6/2008 | |

OTHER PUBLICATIONS

Ticketmaster Credit Card Entry; www.ticketmaster.com/creditcardentry; accessed Oct. 20, 2015; 2 pgs.

* cited by examiner

SYSTEMS AND METHODS FOR FACILITATING EVENT ACCESS THROUGH PAYMENT ACCOUNTS

CROSS-REFERENCE TO RELATED APPLICATION

This application is a continuation-in-part of U.S. patent application Ser. No. 15/062,635, filed on Mar. 7, 2016. The entire disclosure of the above application is incorporated herein by reference.

FIELD

The present disclosure generally relates to systems and methods for facilitating access to events, via access credentials for one or more events based on payment accounts associated with such events, whereby payment devices associated with the payment accounts can then be used to provide access to the events.

BACKGROUND

This section provides background information related to the present disclosure which is not necessarily prior art.

Often, payment accounts are used by consumers to purchase tickets for events such as, for example, sporting events, concerts, transit/travel events, etc. Typically, once the tickets are purchased, they are delivered to the consumers, in person, by mail, or electronically. The tickets may be hard tickets (e.g., paper tickets, etc.) encoded with holograms and/or other security mechanisms, and which are physically delivered to the consumers from the event organizers. Other tickets may be electronic tickets that are delivered to the consumers via e-mail or otherwise from the event organizers. In either case, the tickets are then physically presented by the consumers, at the site of the events, in order for the consumers to gain access to the events.

DRAWINGS

The drawings described herein are for illustrative purposes only of selected embodiments and not all possible implementations, and are not intended to limit the scope of the present disclosure.

Figure 1:
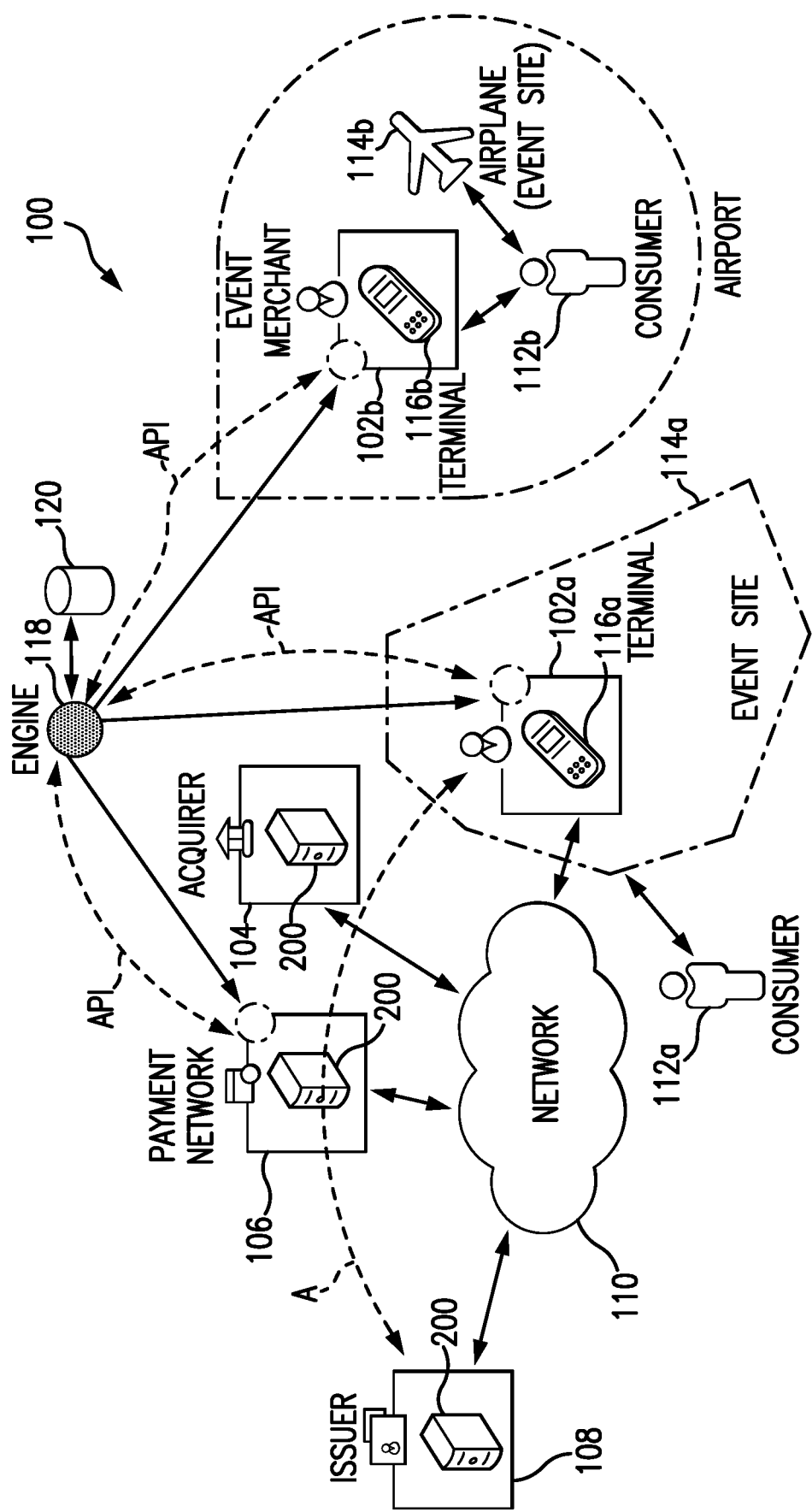
FIG. 1 is a block diagram of an exemplary system of the present disclosure suitable for use in associating access to events, for consumers, with payment accounts of the consumers and for facilitating such access to the events, by the consumers, based on the association.
Figure 3:
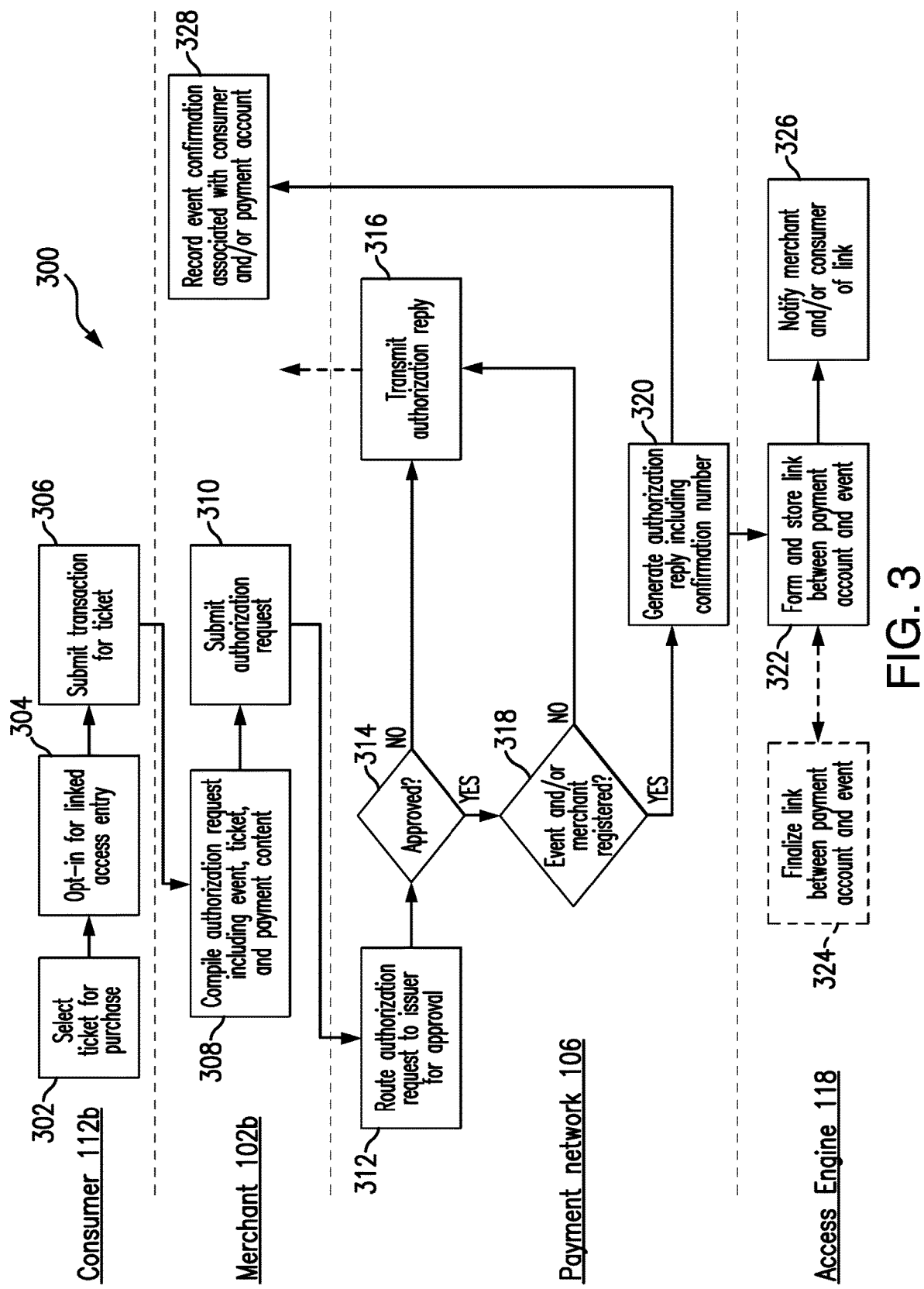
FIG. 3 is an exemplary method, suitable for use with the system of FIG. 1, for associating access to an event with a payment account of a consumer purchasing such access.
Figure 4:
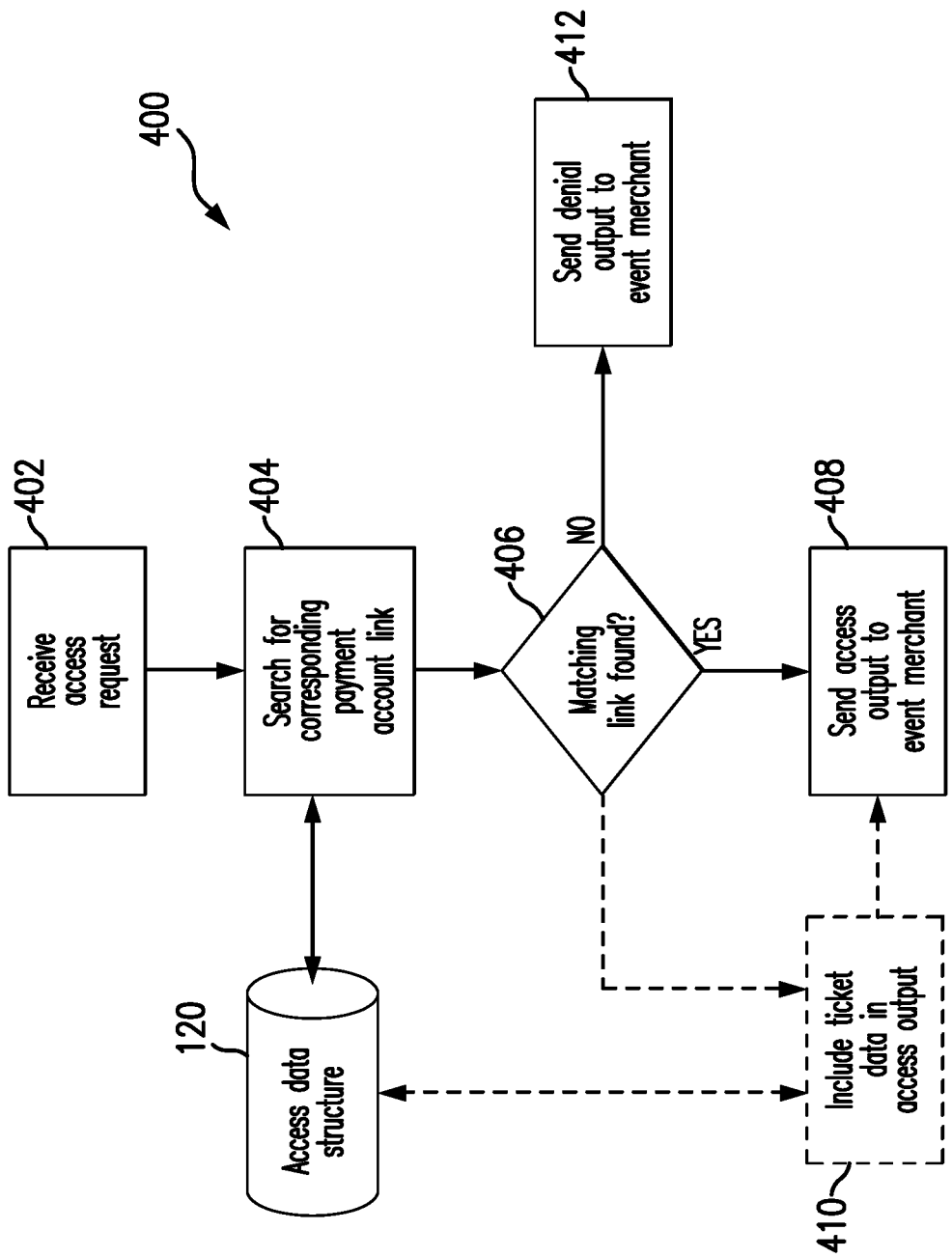
Figure 5:
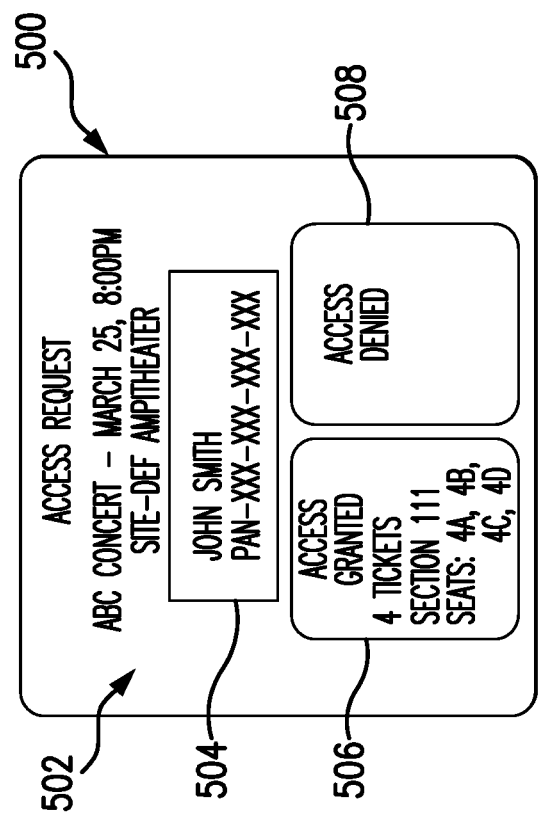

FIG. 4 is an exemplary method, suitable for use with the system of FIG. 1, for facilitating access to an event, for a consumer, through use of a payment account associated with the consumer; and FIG. 5 is an exemplary access interface that may be displayed in connection with the system of FIG. 1 and/or the method of FIG. 3 and/or the method of FIG. 4, for facilitating access to an event, for a consumer, through use of a payment account associated with the consumer.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Tickets, whether in hard or electronic form, are often employed to control access to events, such as, for example, sporting events, movies, concerts, transit, airline flights, etc. Typically, event merchants offer the tickets for sale and sell the tickets to consumers, who then present the tickets, in hard or electronic form, at the events in order to gain access to the events. Uniquely, the systems and methods herein permit linking between payment accounts and events based on purchased tickets, whereby the payment accounts (or payment devices representative thereof, etc.) may be used to gain access to the events. In particular, upon a payment account transaction by a consumer at an event merchant to purchase a ticket to an event, an authorization request is compiled by the event merchant for the transaction, which includes event, ticket, and payment content. When the authorization request is received at a payment network and/or an access engine, a link between the payment account and the event is created (if the transaction is approved, and when the event, the consumer, and/or the event merchant are registered, for example). Subsequently, to gain access to the event, the consumer presents a payment device associated with the linked payment account at the site of the event (e.g., at a gate, etc.). In turn, the event merchant at the site submits an authorization request to the payment network, which is identified as an access request (e.g., by including a reserved merchant category code (MCC) in the authorization request, etc.). In response, the payment network and/or the access engine determines whether the payment account (associated with the presented payment device) is linked to one or more tickets for the event. If such link exists, an authorization reply is returned to the event merchant, which indicates access for the consumer and potentially details of the access for the consumer (e.g., number of tickets, seat numbers, section numbers, etc.).

FIG. 1 illustrates an exemplary system 100, in which the one or more aspects of the present disclosure may be implemented. Although the system 100 is presented in one arrangement, other embodiments may include the parts of the system 100 (or other parts) arranged otherwise depending on, for example, processing of transactions in the system 100, arrangement and/or interoperability of access engines and/or payment networks for facilitating access, etc.

The system 100 generally includes event merchants 102*a-b*, an acquirer 104, a payment network 106, and an issuer 108, each coupled to (and in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which may provide interconnection between one or more of the event merchants 102*a-b*, the payment network 106, an access engine 118, and consumers 112*a-b* (or communication devices associated with the consumers 112*a-b*), etc.

The event merchants 102*a-b* are generally associated with one or more events, such as for example, sporting events, movies, concerts, transit/travel events (e.g., airline flights, bus trips, etc.), etc., to which the event merchants 102*a-b* offer access (e.g., via tickets, passes, etc.) for sale to consumers in the system 100, including the consumers 112*a-b*. In this exemplary embodiment, the merchant 102*a* is a merchant offering tickets for at least one music event, such as, for example, a concert or a festival, while the merchant 102*b* is an airline merchant (e.g., an airline, etc.) offering tickets for airline flights, etc. It should be appreciated that the events for which tickets are offered for sale by the event merchant 102*a-b* are often associated with event sites 114*a-b*, at which the events are located and/or at which event access is needed. The event sites 114*a-b* may include, for example, concert venues, sports arenas/venues, buses, boats, airports, airplanes, theatres, or other locations, vehicles, or transports, often depending on the type of events, etc. Consistent with the above, in this example, the event site 114*a* is a concert venue, at Madison Square Garden, in New York, N.Y., while the event site 114*b* is an airplane, which is scheduled for flight #12345 from St. Louis, Mo., Lambert Airport, to New York, JFK Airport.

The event merchants 102*a-b* may be located at, or in proximity to, the sites of the events (i.e., at the event sites 114*a-b*), as shown in FIG. 1, or geographically separate from the event sites 114*a-b*, or other event sites, in one or more other locations. For example, the airline merchant 102*b* may offer airline tickets for sale through one or more network-based applications (e.g., websites, etc.), which are located apart from the airplane and/or airport (broadly, the event site 114*b*), to which the consumer is purchasing access. Moreover, the event merchants 102*a-b* may include multiple parts/entities located at different areas, for example, at the event sites 114*a-b* and at other sites, etc. Further, the event merchants 102*a-b* may be associated with multiple event sites (including the event sites 114*a-b*) and access thereto, and/or may also be associated with one or more other products (e.g., goods and/or services, etc.) for sale (i.e., as a traditional merchant). It should be appreciated that, while only two event merchants 102*a-b*, two consumers 112*a-b*, and two event sites 114*a-b* are illustrated in the system 100 for ease of reference, a different number of event merchants and/or consumers and/or event sites may be included in the system 100 in other embodiments.

In addition, the event merchants 102*a-b* are also associated with terminals 116*a-b*, such as, for example, point-of-sale (POS) terminals, etc., suitable to interact with the acquirer 104 (which is associated with both event merchants 102*a-b* in the system 100) and/or the payment network 106, or other parts of system 100. In this exemplary embodiment, the terminals 116*a-b* may include, or may be associated with, a network-based application, which is provided to cause the terminals 116*a-b* to uniquely operate as described herein. In particular, the terminals 116*a-b*, for example, may be configured, by the application, to compile authorization messages (e.g., including event content, ticket content, payment content, etc.), to transmit authorization messages, to receive authorization replies, and to, when appropriate, present access outputs (and details) or denial outputs to the event merchants 102*a-b* and/or the consumers 112*a-b*. This will be described in more detail hereinafter.

With continued reference to FIG. 1, each of the consumers 112*a-b* is associated with a payment account, which is associated with a payment device (not shown in FIG. 1). The payment device may be a conventional card form, or may be in a virtual wallet form in a communication device, such as, for example, a smartphone, tablet, etc. The consumers 112*a-b* may purchase access to one or more events from the event merchants 102*a-b*, in the form of tickets (e.g., virtual tickets, etc.), through transactions funded by each consumers' payment accounts.

In one example, the consumer 112*a* may purchase tickets for at least one music event at the event merchant 102*a* (e.g., the concert at Madison Square Garden, etc.), by use of a payment account. As part of the purchase, the consumer 112*a* specifies and/or selects (at the terminal 116*a* or via a sales assistant at the merchant 102*a*) the number of tickets and may further select seats and/or sections within the event site 114*a*. Additional details related to the tickets and/or the consumer 112*a* (or the event) may further be selected, such as, for example, additional access (e.g., backstage access, etc.), ticket type (e.g., standard, VIP, etc.), parking options, etc. Similarly, additional information may be available about the event, from the merchant 102*a*, including, for example, event ID, time/date, event site address, etc. The consumer 112*a* then presents his/her payment device to the event merchant 102*a* for purchase.

In another example, the consumer 112*b* may purchase one or more tickets for flight events (e.g., the ticket for flight #12345 from St. Louis, Mo., Lambert Airport, to New York, JFK Airport; etc.) from the event merchant 102*b*. In doing so, the consumer 112*b* may purchase one ticket or multiple tickets for himself/herself, family, friends, business associates, etc. Further the consumer 112*b* may specify and/or select (at the terminal 116*b* or via a sales assistant at the merchant 102*b*) seat numbers for each of the tickets, or the airline merchant 102*b* may assign seat numbers without the consumer's input, or a combination thereof, etc. Additional details related to the tickets and/or the consumer 112*b* may further be selected, such as, for example, flight numbers, flight origin and/or destination, time/date, additional access (e.g., sky club access, etc.), ticket type (e.g., standard, business class, first class, refundable, nonrefundable, automatic check-in, etc.), meal preferences, special instructions, disability accommodations, frequent flier or rewards content, etc. Similarly, additional information may be available about the event, from the merchant 102*b*, including, for example, event ID (e.g., flight number, etc.), time/date, flight origin and/or destination, etc. The consumer 112*b* then presents his/her payment device to the event merchant 102*b* for purchase.

In the above transactions, either the event merchant 102*a* or the event merchant 102*b*, and specifically, the terminal 116*a* or 116*b* associated therewith, reads the payment devices presented by the consumers 112*a-b* and compiles an authorization request. The authorization request is submitted to the acquirer 104, to determine whether the respective payment account is in good standing and whether there is sufficient credit and/or funds to cover the transaction. The authorization request is transmitted along path A in the system 100, as referenced in FIG. 1. In connection therewith, the acquirer 104 communicates the authorization request with the issuer 108 (associated with the consumer's payment account), through the payment network 106, such as, for example, the payment network operated by Mastercard International Incorporated, the assignee of the present disclosure. In turn, if approved, an authorization reply or response (indicating the approval) is transmitted back from the issuer 108 to the event merchant 102*a* or event merchant 102*b*, along path A, thereby permitting the event merchant 102*a* to complete the transaction. The transaction is later cleared and/or settled (via appropriate transaction messages such as clearing messages and/or settlement messages) by and between the event merchant 102a, the acquirer 104, and the issuer 108 (by appropriate agreements). If declined, however, the authorization reply (indicating a decline) is provided back to the event merchant 102a or the event merchant 102b, along the path A, thereby permitting the event merchant 102a to halt or terminate the transaction.

In connection with the above transactions, both the authorization requests and the authorization replies include ISO 8583 authorization messages (broadly, ISO 8583 transaction messages) (e.g., a 0120 ISO-standard message, another ISO message, etc.). It should be appreciated that similar transactions, resulting in similar messages, may also (or alternatively) be performed between the consumer 112a and the event merchant 102a and/or between the consumer 112b and the event merchant 102b, which may avoid one or more parts of path A above.

Transaction data is generated, collected, and stored as part of the above example interactions among the event merchant 102a, the acquirer 104, the payment network 106, the issuer 108, and the consumer 112a (and among the event merchant 102b, the acquirer 104, the issuer 108, and the consumer 112b). The transaction data represents at least a plurality of transactions, for example, authorized transactions, cleared and/or settled transactions, attempted transactions, etc. The transaction data, in this exemplary embodiment, is stored at least by the payment network 106 (e.g., in a data structure associated with the payment network 106, etc.). Additionally, or alternatively, the event merchants 102a-b, the acquirer 104 and/or the issuer 108 may store the transaction data, or part thereof, in a data structure, or transaction data may be transmitted between parts of system 100 as used or needed. The transaction data may include, for example, primary account numbers (PANs) for consumers involved in the transactions, amounts of the transactions, merchant IDs for merchants involved in the transactions, merchant category codes (MCCs), dates/times of the transactions, products purchased and related descriptions or identifiers, etc. It should be appreciated that more or less information related to transactions, as part of either authorization or clearing and/or settling, may be included in transaction records and stored within the system 100, at the event merchants 102a-b, the acquirer 104, the payment network 106 and/or the issuer 108.

In various exemplary embodiments, consumers (e.g., consumers 112a-b, etc.) involved in the different transactions herein are prompted to agree to legal terms associated with their payment accounts, for example, during enrollment in their accounts, etc. In so doing, the consumers may voluntarily agree, for example, to allow merchants, issuers, payment networks, etc. to use data collected during enrollment and/or collected in connection with processing the transactions, subsequently for one or more of the different purposes described herein. Further, while one acquirer 104, one payment network 106, and one issuer 108 are illustrated in FIG. 1, it should be appreciated that any number of these entities (and their associated components) may be included in the system 100, or may be included as a part of systems in other embodiments, consistent with the present disclosure.

Figure 2:
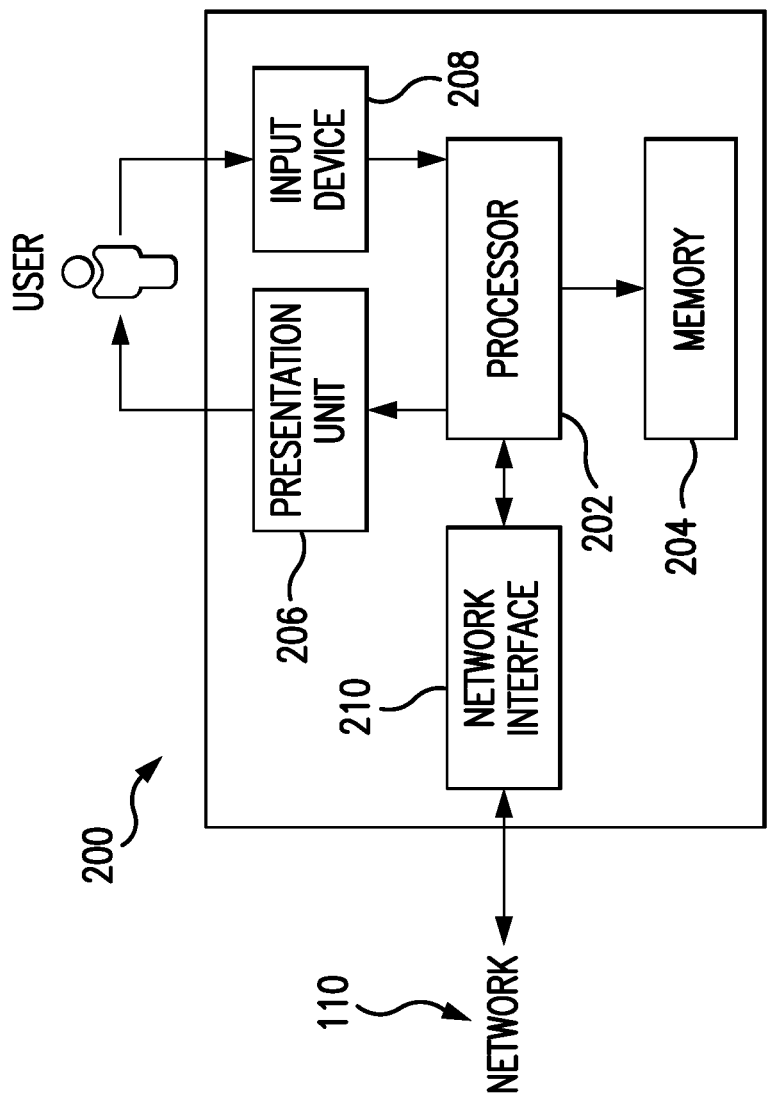
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, POS terminals, laptops, tablets, smartphones, PDAs, etc. In addition, the computing device 200 may include a single computing device, or it may include multiple computing devices located in close proximity or distributed over a geographic region, so long as the computing devices are specifically configured to function as described herein.

In the exemplary embodiment of FIG. 1, each of the acquirer 104, the payment network 106, and the issuer 108 are illustrated as including, or being implemented in, computing device 200, coupled to (and in communication with) the network 110. In addition, the terminals 116a-b and the access engine 118 may each be considered a computing device consistent with computing device 200, for example, to accomplish one or more operations described herein. However, the system 100 (and the various parts thereof) should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, links between payment accounts and events, ticket purchase history and/or details (e.g., number of tickets, seat/section numbers, event IDs, date/time, event site, destinations, origins, descriptions, etc.), and/or other types of data (and/or data structures) suitable for use as described herein.

Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in connection with one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information (e.g., access outputs (and details), denial outputs, etc.), visually, for example, to a user of the computing device 200, such as the consumers 112a-b in the system 100 (e.g., via a communication device consistent with computing device 200, etc.); users associated with one or more of the event merchants 102*a-b* and/or the terminals 116*a-b*; etc. It should be further appreciated that various interfaces (e.g., as defined by internet-based applications, websites, etc.) may be displayed at computing device 200, and in particular at presentation unit 206, to display certain information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices. Additionally or alternatively, the presentation unit 206 may include printing capability, enabling the computing device 200 to print text, images, and the like on paper and/or other similar media. For instance, the terminals 116*a-b* may print out access and/or event information, onto paper, as described below.

In addition, the computing device 200 includes an input device 208 that receives inputs from the user (i.e., user inputs) such as, for example, selections of events and/or details related thereto, selections to opt into linking payment accounts and event access, different inputs for the user to register to the access engine 118, etc. The input device 208 may include a single input device or multiple input devices. The input device 208 is coupled to (and is in communication with) the processor 202 and may include, for example, one or more of a keyboard, a pointing device, a mouse, a stylus, a magnetic stripe reader, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks, including the network 110. Further, in some exemplary embodiments, the computing device 200 includes the processor 202 and one or more network interfaces incorporated into or with the processor 202.

Referring again to FIG. 1, the system 100 includes the access engine 118, which is specifically configured, by computer executable instructions, to perform one or more of the operations described herein. The access engine 118 is illustrated as being a standalone part of the system 100, but is described in the following example as associated with the payment network 106 (as indicated by the solid arrow line), such that it may be incorporated in whole or in part, therein. As described above, the access engine 118 may be considered a computing device consistent with computing device 200 (or may be considered implemented via the computing device 200 associated with the payment network 106). Moreover, as indicated by the additional solid arrow lines extending from the access engine 118 and the dashed circles at the event merchants 102*a-b*, the access engine 118 may additionally (or alternatively) be associated or incorporated (at least in part) with the event merchant 102*a* and/or the event merchant 102*a-b*. Further, in various other embodiments, it should be appreciated that the access engine 118 may be associated with, or incorporated with, still other parts of the system 100, for example, the acquirer 104, the issuer 108, etc., or may be a standalone part of the system 100.

In this exemplary embodiment, the access engine 118 alone, or in combination with the payment network 106, is configured to provide a linked access service to merchants, including the merchants 102*a-b*, and to consumers, including the consumers 112*a-b*. In connection therewith, the access engine 118 is configured to register the merchants 102*a-b* (to the access engine 118), and the events for which tickets are offered for sale by the merchants 102*a-b* (prior to occurrences of the events). It should be appreciated that a variety of different registration techniques and/or interactions are within the scope of the present disclosure. Regardless of the techniques and/or interactions, though, the access engine 118 is configured to then compile a list of registered merchants and/or events (which may be incorporated into an access data structure 120, described below) for use in ultimately providing access to the consumers 112*a-b* for the events.

As an example, the access engine 118 may register merchants (including the merchants 102*a-b*) via a merchant portal (e.g., via a user interface associated therewith, a web service associated therewith, an appropriate network-based application, etc.) for the linked access services described herein. In connection therewith, the access engine 118 may include (or be associated with) a relational data structure (e.g., as part of the access data structure 120, etc.) that can be accessed by the merchants, via the merchant portal, to allow the merchants to tie/link their events to specific terminals (e.g., to terminals 116*a-b*, etc.), which will be used by the merchants to facilitate access to the events. In so doing, the terminals may be identified either via an Acquirer ICA (Interbank Card Association) and/or a Merchant ID or other data fields configured on the terminals to show as "gateways" for the specified events to grant access. In addition, the relational data structure may include information, as received from the merchants during registration via the merchant portal (or received otherwise), relating to the merchants (e.g., contact information, address, website information for customer servicing, notification preferences, etc.) and relating to various events associated with the merchants and desired to be registered (e.g., information identifying the events as relating to air travel, rail travel, theatre events, musical concerts, etc.; geo-locational data about the events; latitude and longitude coordinates for the events; etc.). Then, once registered, the merchant portal may instruct the merchants how to configure their new events and how to do configure their terminals for the specific events, and may generate/facilitate notifications (e.g., real-time notifications, etc.) for the merchants regarding their registered events.

In the above transaction between the event merchant 102*a* and the consumer 112*a* (for the purchase of the ticket to the concert at Madison Square Garden), when the purchase of the ticket from the event merchant 102*a* is attempted, the terminal 116*a* is configured to compile or generate the authorization request (e.g., an ISO 8583 message, etc.), and include or append event content, ticket content and payment content in or to the authorization request. The event content may include, without limitation, the event ID, the event name, the event location, etc. for the selected event, and the ticket content may include, for example, number of tickets, seats, section, ticket type, etc. purchased. The payment content may include, without limitation, a primary account number or PAN, an expiration data, etc. (broadly, payment credentials) for the consumer's payment account (used in the transaction). Such content included in the authorization request may be the result of inputs from consumer 112*a* during the transaction, the programming of the terminal 116*a* (by the merchant 102*a* and/or the acquirer 104), and/or direct inputs from the merchant 102*a* (e.g., via an employee, an attendant, etc.). Further, the consumer 112*a* may provide an input (or be prompted to provide such an input) to opt into an event access linking service, as described herein. The authorization request may further include one or more indicators of the authorization request being specific to a ticket purchase transition (e.g., as included in transaction data in the message, such as a particular MCC for the event merchant 102*a*, a particular transaction ID for the ticket being purchased, etc.). The indicators may signal to the access engine 118, then, to act thereon.

The terminal 116*a* is also configured to transmit the authorization request for the transaction, along path A, to the acquirer 104, as described above. In turn, the acquirer 104 transmits the authorization request to the payment network 106, and the payment network 106 and/or the access engine 118 (through access provided by the payment network 106) is configured to route the authorization request to the issuer 108 (again, as described above).

Then, upon receipt of the authorization request (or upon identifying that the authorization request involves event access (e.g., includes an event indicator, etc.)), the access engine 118 is configured to determine whether the event identified in the authorization request and/or the merchant 102*a* are registered with the access engine 118 (e.g., in the relational data structure in the above example, etc.). If each is registered (and the transaction is approved by the issuer 108), the access engine 118 is configured to generate a link between the payment account funding the transactions (or another payment account as specified by the consumer 112*a*, for example) and the event. The access engine 118 is further configured to append and/or store the link in the access data structure 120 associated with the access engine 118 (e.g., in memory 204 included in the access engine 118, etc.). Optionally, the access engine 118 is configured to notify the merchant 102*a* and/or the consumer 112*a* of the link between the payment account and the event. In connection therewith, contact information for the merchant 102*a* may be obtained during registration of the merchant 102*a* to the access engine 118 (as described above). And, contact information for the consumer 112*a* may be obtained, by the access engine 118, based on transaction data generated in connection with purchase of the underlying ticket for the event (where the consumer 112*a* may provide such contact information as part of purchasing the ticket). Alternatively, if the consumer 112*a* uses his/her virtual wallet in purchasing the ticket for the event, application notifications may be used to confirm the link between the consumer's payment account and the event, via the wallet.

In addition in this example, once the transaction for the ticket is approved, and the link is generated and stored (at the access data structure 120), the payment network 106 and/or the access engine 118 is further configured to generate an authorization reply, to be transmitted back to the merchant 102*a* in response to the authorization request. The authorization reply (e.g., an ISO 8583 message, a 0120 ISO-standard message, another ISO message, etc.) may be generated, in whole or in part, based on a reply received from the issuer 108. For example, the authorization reply may include the reply from the issuer 108 (indicating approval of the transaction) with a confirmation number appended thereto.

While the payment network 106 and the access engine 118 are described as configured to operate as described above, it should be appreciated that the payment network 106 may be configured to accomplish certain operations herein, while the access engine 118 is configured to then accomplish certain other operations. In such embodiments, the payment network 106 and the access engine 118 are configured to interact and/or communicate via one or more application programming interfaces (APIs), for example, as shown in FIG. 1, thereby permitting registrations and registration data, event data, event links, authorization requests, authorization replies, etc. to pass therebetween.

It should be appreciated that the payment network 106 and/or the access engine 118 are configured to perform substantially consistent as described above, for the example transaction between the event merchant 102*b* and the consumer 112*b* in generating and transmitting the corresponding authorization request (containing event content for the airline flight from St. Louis, Mo., Lambert Airport, to New York, JFK Airport, and ticket content identifying flight #12345). In so doing, a payment account for the consumer 112*b* can then be linked to the event for which the ticket was purchased from the merchant 102*b* (with the link stored in the access data structure 120). Specifically, while the process and/or content of the authorization request and/or authorization reply may be altered, based on the particular type of merchant 102*b*, the operations are substantially consistent.

In the illustrated embodiment, the above-described links between the consumers' payment accounts and the events are generated based on the authorization messages involving the payment network 106. However, it should be appreciated that such links may be generated outside of the payment network 106 in other embodiments. Specifically, for example, when the example transaction between the event merchant 102*a* and the consumer 112*a* occurs at the terminal 116*a*, the terminal 116*a* may communicate directly with the access engine 118, through one or more APIs and/or the network 110 (and not through the payment network 106), to provide certain content related to the event, the tickets and/or the payment account. In these embodiments, the event merchants 102*a*-*b* and/or the consumers 112*a*-*b* may opt-in for enrollment with the access engine 118 (e.g., via the merchant portal as described above, via a similar consumer portal, etc.), to generate the link between the tickets purchased by the consumers 112*a*-*b* and the consumers' payment accounts. Additionally, or alternatively, the access engine 118 may be associated with a network-based application, whereby the consumers 112*a*-*b* may register the purchased tickets to the consumers' selected payment accounts, with the access engine 118, to enable the subsequent access interactions for the events corresponding to the tickets, as described below (e.g., via a consumer portal, etc.).

Also in the illustrated embodiment, the access engine 118 may include one or more APIs, which may be called by the event merchants 102*a*-*b* (e.g., by the terminals 116*a*-*b* when used to perform the purchase transactions for the various tickets, etc.) and/or the issuer 108, etc., in order to facilitate the operations described herein (i.e., apart from the path A of FIG. 1). A call to one of the APIs in the system 100 is indicated by the dotted lines in FIG. 1. It should be appreciated that the access engine 118 may include other APIs in other embodiments, which may be called by the same and/or other parts of the system 100 (e.g., a network-based application active in communication devices associated with the consumers 112*a*-*b*, etc.) to access, create, edit, add, or delete, one or more payment account links, or otherwise manage the consumers' accounts.

Further in the illustrated embodiment, the access engine 118 is configured to facilitate access to the events, for which the tickets are purchased by the consumers 112*a*-*b* from the event merchants 102*a*-*b*, without the consumers 112*a*-*b* needing to present the physical tickets for the events. The following describes operation of the access engine 118 to facilitate access to the event (e.g., the concert at Madison Square Garden) associated with the ticket purchased by the consumer 112a from the merchant 102a. However, it should be appreciated that the access engine 118 is configured to perform substantially the same in connection with facilitating access to the event (e.g., the flight from St. Louis, Mo., Lambert Airport, to New York, JFK Airport) associated with the ticket purchased by the consumer 112b from the merchant 102b.

In particular, when the consumer 112a desires to access the event at the event site 114a, the consumer 112a presents payment credentials (e.g. in the form of a payment device, etc.) to the event merchant 102a, via the terminal 116a, to gain access to the event. In response, the terminal 116a is configured to generate an authorization request for the event that is transmitted through the payment network 106, along path A. In turn, the payment network 106 and/or the access engine 118 is configured to intercept the authorization message (e.g., directly, via an API between the payment network 106 and the access engine 118, etc.), sent from the event merchant 102a, as being an access request. For example, the payment network 106 and/or access engine 118 may detect a reserved MCC, which is reserved for access requests. Like above, the authorization request includes payment account content, and may further include event content. In general, the authorization request will not be forwarded along path A to the issuer 108. Once intercepted, the access engine 118 is configured to search, in the access data structure 120, for a link between the payment account indicated in authorization request and the event.

In this example access request, if a link is found in the access data structure 120, the access engine 118 is configured to return an authorization reply to the event merchant 102a. The authorization reply includes at least an access output and, often, additional ticket content related to the tickets purchased by the consumer 112a (e.g., a number of tickets purchased when appropriate; ticket details such as seat/section numbers, etc.; and other potentially useful information, etc.). The reply, for example, may include the consumer's payment account number as data element (DE) 2, the number of tickets purchased by the consumer (and, thus, the number of accesses allowed to the event) as DE 6, and the event ID for the particular event as DE 42. Additional details, such as seat/section number(s), etc., may be included in the reply in the same or additional data elements. The detail may be displayed to the merchant 102a and/or the consumer 112a, at the terminal 116a, which may display the ticket details and/or provide a physical print out including the ticket details (e.g., to assist the consumer 112a in finding his/her seat, etc.). In addition, in some embodiments, event/access details may be provided to the consumer 112a in the form of information displayed on a screen and/or printed on paper or similar media, and/or provided to a communication device associated therewith.

Alternatively, if no link is found between the consumer's payment account (as presented at the event site 114a) and the event, the access engine 118 is configured to return an authorization message to the event merchant 102a, indicating a denial output for the consumer 112a to access the event.

FIG. 3 illustrates an exemplary method 300 of linking a payment account to an event, for use in providing subsequent access to the event based on credentials for the payment account. The exemplary method 300 is described herein in connection with the event merchant 102b of the system 100 (although the description is equally applicable to the event merchant 102a), and may be implemented in the access engine 118. Further, for purposes of illustration, the exemplary method 300 is also described with reference to computing device 200. However, it should be appreciated that the method 300, or other methods described herein, are not limited to the system 100, or computing device 200. And, conversely, the systems and computing devices described herein are not limited to the exemplary method 300.

Initially in the method 300, the consumer 112b selects, at 302, a ticket for purchase from the event merchant 102b for a flight event. As described above, the flight event may include an airline flight, which is flight #12345, between two locations (e.g., New York, N.Y. and St. Louis, Mo., etc.). In so doing, the consumer 112b provides various preferences regarding the ticket, such as origin, destination, flight date/time, flight number, desired seat number, ticket type, etc. In addition, the consumer 112b provides payment credentials, for the consumer's payment account, to the event merchant 102b, to effect purchase of the ticket (e.g., via a payment device, etc.). This may be done via the terminal 116b associated with the event merchant 102b, but may also be accomplished remote from the event merchant 102b, via a virtual storefront, for example.

As part of the interaction with the terminal 116b (or virtual storefront, etc.), the consumer 112b is prompted to opt into linked access entry, with the access engine 118, whereby the consumer's payment account is linked to the ticket and/or event, and the payment device may then be used to subsequently access the event and/or event site 114b (see method 400). In response, the consumer 112b opts into the linked access entry, at 304. As part of this operation (and if the consumer 112b has not already done so via a general registration with the access engine 118), the consumer 112b may also provide contact information (e.g., e-mail address, phone number etc.) for use in receiving subsequent notifications, from the access engine 118, regarding the link, the event, etc. Alternatively, if such linked access entry is not available for the particular ticket and/or event, such an option will not be available or presented to the consumer 112b. Thereafter, the consumer 112b submits the transaction for the ticket to the merchant 102b, at 306.

Next in the method 300, the event merchant 102b compiles, at 308, an authorization request for the transaction. In this exemplary embodiment, the terminal 116b includes various detail regarding the event (broadly, event content) and the ticket being purchased (broadly, ticket content). Specifically, in this example, the terminal 116b is aware of the flight number, the origination city (or airport name), the destination city (or airport name), flight time/date, and further that two tickets are being purchase and seats 12a and 12b, in coach class, are associated with those tickets. As such, the terminal 116 compiles the authorization request, which is consistent with the ISO 8583 standard, with flight #12345, STL, JFK, 09:00, MM.DD.YYYY (event content), and 2, coach class, 12a, 12b (ticket content) all included in various data elements of the request (e.g., without limitation, in DE 125; etc.). It should be appreciated that the particular event and ticket content will be different depending on the type of event. For example, the ticket content for a sporting event may include number of tickets, section, row and seat number (for each ticket), etc., while the event content may include the time/date, stadium name, home team, visiting team, etc.

In addition to the event and ticket content, the terminal 116 further compiles payment account content into the authorization request (at 308). Payment account content includes, as is conventional, the primary account number (PAN) for the payment account, security codes, expiration date, purchase amount, merchant ID, etc. In addition, the payment account content may include a merchant category code or MCC for the event merchant 102b, and/or a different MCC. Specifically, for example, the MCC included in the payment account content may be a reserved MCC, which is not indicative of a category of merchant, but instead is indicative of an access related transaction. Use of the MCC is described further with reference to the payment network 106 and the access engine 118.

Once the authorization request is compiled, the terminal 116b (or merchant 102b) submits, at 310, the authorization request, along path A in FIG. 1, to the acquirer 104 and then to the payment network 106.

In response, the payment network 106 routes the authorization request, at 312, to the issuer 108, to determine whether the transaction is approved or declined. As conventional, the issuer 108 may employ a variety criteria and/or metrics to determine, for example, if the consumer's payment account is in good standing, if sufficient funds are available in the consumer's payment account for the purchase, if the transaction appears fraudulent or not, etc. Once the issuer 108 responds (with an authorization reply), the payment network 106 determines, based on the authorization reply, whether the transaction is approved or declined, at 314. If the transaction is declined, the payment network 106 transmits the authorization reply to the event merchant 102b (generally as received from the issuer 108), at 316, declining the transaction, thereby permitting the event merchant 102b to halt or terminate the transaction.

However, if the transaction is approved, the payment network 106 determines, at 318, whether the event, associated with the ticket purchased by the consumer 112b, and/or the merchant 102b are registered with the access engine 118. Specifically, when merchants, including the merchants 102a-b, register with the access engine 118 (or the payment network 106) and/or register events with the access engine 118 (or the payment network 106), as described above, a listing of the registered merchants and/or events is maintained, by the access engine 118 (e.g., in the relational data structure associated with the access data structure 120, etc.). The registered merchants may be entitled to one or more additional services by the payment network 106, or may be subject to additional fees and/or other charges for use of the access engine 118, which, in turn, provides linked access to their consumers, including consumers 112a-b. As such, in the method 300, when the transaction is determined to be approved (at 314), the payment network 106 determines if the merchant 102b and the flight #12345 event are included in the listing of registered merchants and events (e.g., via communication with the access engine 118 such as an API call to the access engine 118, to the relational data structure associated with the access engine 118, etc.). If one or the other is not registered, the payment network 106 transmits the authorization reply to the event merchant 102b (generally as received from the issuer 108), at 316, approving the transaction, thereby still permitting the event merchant 102b to proceed with the transaction.

Conversely, if the merchant 102b and the flight #12345 event are registered (at 318), as in this example, the payment network 106 generates and transmits an authorization reply, at 320. The authorization reply generally includes at least part of the authorization reply received from the issuer 108, but further includes a confirmation number indicating the payment account is linked to the event. In one example, in generating the authorization reply, the payment network 106 merely appends the confirmation number to the authorization reply received from the issuer 108 and further transmits the authorization reply, at 320. In another example, the payment network 106 generates an authorization reply based on only a portion of the authorization reply from the issuer 108 and includes the confirmation number, prior to transmitting it, at 320, whereby at least a portion of the authorization reply from the issuer 108 is excluded from the transmitted authorization reply.

Further, as shown in FIG. 3, the authorization reply, generated at 320, is provided to the access engine 118. In response, the access engine 118 forms and stores a link between the payment account and the event, at 322. This link may be based on information included in the authorization request and/or the authorization reply, and/or based on information in the access data structure 120. In particular, the link may include at least the payment account and an event ID for the event, and may further include other details from the event content, the ticket content, or the payment account content included in the authorization request (and potentially in the authorization reply), and/or may also include the confirmation number. In one example, when the authorization request is submitted, or upon receiving the authorization reply, the access engine 118 may retrieve the payment account content and confirmation number from the authorization reply, and retrieve any necessary information for the event (e.g., event content and ticket content, etc.) from the access data structure 120 (e.g., directly, via an API call, etc.). As such, the link is generally created (at least preliminarily) by the access engine 118 (at 322) when the ticket is purchased by the consumer 112b from the event merchant 102b. The link may then later, optionally (as indicated by the dotted lines in FIG. 3), be finalized by the access engine 118, at 324, upon clearing and settling of the transaction (with additional/complete clearing information/details for the transaction and/or complete information/details for the event further appended to the link). In this manner, by requiring the link to be finalized, if the underlying transaction for the ticket does not clear, access would not be available/granted (even though the link is already created).

As further shown in FIG. 3, the access engine 118 then notifies, at 326, the merchant 102b and/or the consumer 112b that the link has been formed and stored, and is available to be utilized as a manner of access the event. The notification may be provided via e-mail, short message service (SMS) message, etc. The contact information for the merchant 102b and/or the consumer 112b may be retrieved from the registration of the merchant 102b and/or the consumer 112a-b, as described above.

In response, the merchant 102b records, at 328, the confirmation number associated with the consumer 112b, the event and the payment account. In this manner, the merchant 102b is able to maintain a record of the tickets sold for the event or event(s), potentially altering the tickets available for sale by the merchant 102b accordingly (e.g., marking tickets for seats as sold, or reducing a number of available tickets, etc.).

It should again be appreciated that the method 300 may include additional operations, or fewer operations, in other embodiments. In particular, it should be appreciated that the operations attributed to the payment network 106 and the access engine 118 may be accomplished by the payment network 106 alone, the access engine 118 alone, or some different combination of the two. Additionally, in at least one embodiment, the access engine 118 is incorporated into the payment network 106, whereby each operation may be attributed to the payment network 106, etc.

FIG. 4 illustrates an exemplary method 400 of facilitating access to a registered event, for a consumer, through use of a payment account linked to such access to the event (e.g., via a ticket, etc.). The exemplary method 400 is described herein in connection with the event merchant 102*b* of the system 100 (although the description is equally applicable to the event merchant 102*a* as well), and may be implemented in the access engine 118 of the system 100. Further, for purposes of illustration, the exemplary method 400 is also described with reference to computing device 200. However, it should be appreciated that the method 400, or other methods described herein, are not limited to the system 100, or computing device 200. And, conversely, the systems and computing devices described herein are not limited to the exemplary method 400.

As described in connection with the system 100, when the purchase of the ticket (or multiple tickets) for the registered event (e.g., the flight from St. Louis, Mo., Lambert Airport, to New York, JFK Airport) at the event site 114*b* is completed by the consumer 112*b*, the access engine 118 is configured to generate a link (or association) between the purchased ticket (broadly, the access to the event) and the payment account associated with the consumer 112*b*. The payment account may be the payment account used by the consumer 112*b* to purchase the ticket, or it may include another payment account associated with the consumer 112*b* and specifically selected by the consumer 112*b* for association with the ticket (e.g., during general registration of the consumer 112*b* for linked access entry, when opting into linked access entry for a particular transaction, etc.). The link between the ticket purchased by the consumer 112*b* and the consumer's payment account is then stored in the access data structure 120 associated with the access engine 118. With that said, and as described above, in various embodiments, the consumer 112*b* may voluntarily register with the access engine 118 for such linking, or the consumer 112*b* may be provided an option to link a payment account with the ticket during purchase, or the linking option may be provided to the consumer 112*b* as an optional service by one or more of the payment network 106, the issuer 108, etc.

It should be appreciated that the ticket may be purchased by the consumer 112*b* from the event merchant 102*b*, as described in connection with the system 100, or from another merchant selling tickets to the same event (e.g., on behalf of the event merchant 102*b*, separate from the event merchant 102*b*, etc.). In either case, the access engine 118 is configured to identify the purchase (e.g., based on transaction data generated in response to the purchase, etc.) and link the ticket to the desired payment account associated with the consumer 112*b*. Or, the consumer 112*b* may voluntarily link the purchased ticket to the payment account, independent of the actual purchase. In addition, the consumer 112*b* may purchase multiple tickets to the event (e.g., for his/her family, etc.), and the access engine 118 may then link the multiple tickets to the consumer's selected payment account. Further, the consumer 112*b* may purchase tickets to multiple different events, and the access engine 118 may link the different tickets to the consumer's selected payment account.

In any case (and regardless of how or when the consumer's ticket is linked to the consumer's selected payment account), when the consumer 112*b* desires to access the registered event for which the ticket was purchased (e.g., at an airport associated with the event site 114*b*), the consumer 112*b* presents information to the event merchant 102*b*, at the event site 114*b* for the event, regarding the consumer's payment account linked to the purchased ticket (e.g., an account number, etc.). In response, the event merchant 102*b* generates an access request for the event (e.g., an ISO 8583 message, another ISO message, another message, etc.), and transmits the access request along path A in the system 100. The access request includes payment account data for the consumer's payment account as well as event data for the event to which access is being requested (e.g., based on configuration of the terminal 116*b*, based on inputs to the terminal 116*b* by the consumer 112*b* or other user, etc.). In addition, the access request includes an event identifier that distinguishes the access request from other transaction messages transmitted along path A (e.g., an event ID, etc.). As such, in the method 400, when the event identifier is recognized (e.g., by the payment network 106, etc.), the access request is routed to the access engine 118. In turn, and as shown in FIG. 4, the access engine 118 receives the access request from the event merchant 102*b*, at 402.

As an example, the event merchant 102*b* may receive payment account information from the consumer 112*b* via the terminal 116*b* at the event (e.g., from a payment device presented by the consumer 112*b* to the terminal 116*b*, where the terminal 116*b* is a POS terminal; etc.). In response, the terminal 116*b* may generate an access request that includes an ISO 8583 authorization request message, and transmit the message along path A in the system 100. The authorization request message includes details regarding the event (e.g., a name of the event, a location of the event, a date of the event, etc.) and the consumer's payment account (e.g., a payment account number, etc.), as well as a particular MCC identifying the transaction as an access request transaction. In this example, as the message proceeds along path A in system 100, the payment network 106 identifies the particular MCC in the message and routes the message to an API associated with the access engine 118.

With continued reference to FIG. 4, upon receiving the access request from the event merchant 102*b*, the access engine 118 searches, at 404, for a corresponding payment account link in the access data structure 120. For example, the access engine 118 may initially extract the consumer's payment account number and the pertinent event data for the event from the access request. The access engine 118 may then search (e.g., via key word searching, etc.) in the access data structure 120 for the consumer's payment account number to determine if the payment account is linked with the particular event to which access is requested. Alternatively, the access engine 118 may search in the access data structure 120 for the particular event, and then determine if the consumer's payment account number is associated with the particular event in order to determine if the payment account is linked with the event. In either case, the access engine 118 may also determine, as part of the search, how many tickets are available to the consumer 112*b* for use, and if any of the tickets have already been used/claimed.

When a matching link is identified in the access data structure 120, at 406, the access engine 118 transmits an access output to the event merchant 102*b*, at 408 (e.g., an ISO 8583 message, another ISO message, another message, etc.). The access output indicates that the consumer's payment account is linked to the ticket for the particular event (e.g., that the consumer 112*b* has in fact purchased the ticket for the event, etc.), such that the event merchant 102*b* can allow the consumer 112*b* to access the event. In addition, the access engine 118 may optionally (as indicated by the broken lines in FIG. 4) include in/with the access output, at 410, details of the ticket purchase (e.g., as determined by the access engine 118 during the search at 404, etc.). For example, the access engine 118 may include, with the access output, an indication (or indicator) of access to the particular event, as well as seat/section numbers, a total number of tickets purchased, and a total number of tickets used, etc.

In connection with the above example, the access output may include an ISO 8583 authorization reply message. Here, when the access engine 118 determines that the consumer's payment account is linked to the particular registered event to which access is requested, the access engine 118 generates the reply message and transmits the message to the terminal 116b back along path A in the system 100. In particular, the access engine 118 transmits the reply message to the payment network 106, which in turn transmits the reply message to the terminal 116b via the acquirer 104. In this example, and as shown in the system 100, the reply message includes (without limitation) the consumer's payment account number as DE 2, the number of tickets purchased by the consumer 112b (and, thus, the number of accesses allowed to the event) as DE 6, the MCC for the particular event as DE 18, and the event ID for the particular event as DE 42. The reply message thus represents a zero transaction through the payment network 106. In some embodiments, the authorization reply message may include one or more extended data elements (or entries), which may contain additional event and/or access information. For instance, the extended data elements may include seat numbers, etc. Then, the terminal 116b may print the extended data elements, such as the seat numbers, etc., for the purpose of granting entry and/or providing the consumer 112b with additional access and/or event information.

Alternatively in the method 400, when a matching link is not identified by the access engine 118 (at 406), the access engine 118 transmits a denial output to the event merchant 102b, at 412. The denial output indicates that the consumer's payment account is not linked to the ticket for the particular event, such that the event merchant 102b may not allow the consumer 112b to access the event. In connection with the above example, and as described for the access output, the denial output may include an ISO 8583 authorization reply message generated by the access engine 118 and transmitted to the terminal 116b in similar fashion to the access output.

FIG. 5 illustrates an exemplary access interface 500 that may be displayed at a terminal and/or at a portable computing device associated with one or more of a consumer and an event merchant (as defined by instructions therein) in connection with either the access output or the denial output for an event access request (e.g., as described in the method 400, etc.). The interface 500 includes an indication 502 of a particular event (i.e., ABC Concert) to which the consumer is requesting access, as well as an identification 504 of the consumer (i.e., John Smith) and the consumer's linked payment account number. The interface 500 also includes buttons 506, 508 that are configured to be highlighted to indicate that access is either granted to the particular event or denied, respectively.

In the illustrated embodiment, the interface 500 is displayed in connection with access being granted to the event ABC Concert. As such, the button 506 indicating that access is granted to the event is highlighted. In addition, the interface 500 identifies, at the button 506, particular details regarding the event, including the total number of tickets available to John Smith for the event and the section/seat numbers for each of the tickets.

With that said, other interfaces and/or access inputs or outputs may be used in connection with the system 100 of FIG. 1 and/or the methods 300, 400 of FIGS. 3 and 4. In other embodiments, for example, access interfaces may include additional and/or different fields and/or formats providing additional and/or different data to event merchants and/or consumers for review/consideration when deciding access to a particular event.

It should be appreciated that the functions described herein, in some embodiments, may be described in computer executable instructions stored on a computer readable media, and executable by one or more processors. The computer readable media is a non-transitory computer readable media. By way of example, and not limitation, such computer readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving an authorization request for purchasing access to an event, the authorization request including event content, ticket content, and payment content, the authorization request associated with a merchant; (b) determining whether the merchant is registered; (c) determining whether the event is registered; (d) when the merchant and the event are registered, storing, in memory, a link between a payment account identified in the payment content and the event, whereby the link is able to be retrieved, by the merchant, via a subsequent authorization request, to indicate access to the event; (e) generating an authorization reply and transmitting the authorization reply to the merchant; (f) finalizing the link in the memory upon clearing and/or settling of the purchase of the access; and (g) notifying at least one of the consumer and the merchant of the link between the payment account and the event.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments disclosed herein may provide all or none of the above mentioned advantages and improvements and still fall within the scope of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "in communication with," or "included with" another element or layer, it may be directly on, engaged, connected or coupled to, or associated or in communication or included with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method of linking access credentials with payment accounts, the method comprising:
   receiving, at a payment network computing device, a first authorization request for a purchase of access to an event, the first authorization request including event content indicative of the event, ticket content, and payment content indicative of a payment account, wherein the first authorization request is specific to a merchant;
   forwarding a first authorization reply from an issuer of the payment account in response to the first authorization request to the merchant, the first authorization reply including an indication of the purchase of the access being approved;
   determining, at the payment network computing device, that the merchant is registered for linked access entry and the event is registered for linked access entry;
   storing, in memory of the payment network computing device, a link between the payment account and the event;
   identifying, at the payment network computing device, a second authorization request, from a point-of-sale (POS) device at a site of the event, as an access request for the event based on the second authorization request including a merchant category code (MCC) unidentified to any category of merchant, the second authorization request including the payment content;
   identifying, by the payment network computing device, based on the payment content included in the second authorization request, the link in the memory between the payment account and event for which access is requested;
   based on the identified link, generating, by the payment network computing device, a second authorization reply, the second authorization reply including the ticket content and indicating access for a user at the POS device to the event, consistent with the ticket content included in the second authorization reply and without the user separately presenting additional user credentials; and
   transmitting the second authorization reply to the POS device at the site of the event.

2. The computer-implemented method of claim 1, wherein the event includes one of an airplane flight and a concert.

3. The computer-implemented method of claim 1, wherein the second authorization reply includes a confirmation code indicative of the access for the user to the event.

4. The computer-implemented method of claim 1, wherein storing the link between the payment account and the event includes storing the link when the first authorization reply indicates approval of the purchase of the access;
   further comprising finalizing, by the payment network computing device, the link in the memory upon clearing and/or settling of the purchase of the access by a payment network for the issuer of the payment account.

5. The computer-implemented method of claim 1, further comprising, after transmitting the second authorization reply to the POS device at the site of the event, marking, in the memory, the link to the indicated access as used; and
   wherein the second authorization reply includes an ISO-standard message having an access granted indication.

6. The computer-implemented method of claim 1, wherein the event includes an airplane flight; and
   wherein the ticket content includes a number of tickets and/or a seat assignment for each ticket.

7. A system for use in facilitating access to events, through use of payment accounts, the system comprising:
   a payment network in communication with an issuer;
   wherein the payment network is configured to:
      receive an initial authorization request for a transaction for access to an event directed to the payment network, the initial authorization request specific to a merchant and being directed to a payment account issued by the issuer, the initial authorization request including event content for the event, ticket content and payment content indicative of the payment account;
      route the initial authorization request to the issuer for approval;
      in response to the transaction being approved by the issuer, determine whether the event is registered;
      in response to the event being registered:
         append a confirmation code to an authorization reply and transmit the authorization reply, with the confirmation code, to the merchant in response to the initial authorization request, the confirmation code indicative that the payment account is linked to the event; and compile and append a link between the payment account included in the initial authorization request and the event to an access data structure; and then receive a subsequent authorization request from a point-of-sale (POS) terminal at a site of the event, the subsequent authorization request including the payment content and a merchant category code (MCC) unidentified to any category of merchant;

in response to the MCC included in the subsequent authorization request, identify the event for which access is requested and the payment account of a user requesting access based on the event content and the payment content of the subsequent authorization request;

search for the link between the identified event and the payment account stored in the access data structure; and in response to the link being identified in the access data structure, transmit a subsequent authorization reply in response to the subsequent authorization request, the subsequent authorization reply directed to the POS terminal at the site of the event, the subsequent authorization reply including the ticket content and providing access for the user to the event via the POS terminal at the site of the event, consistent with the ticket content, without the user separately presenting additional credentials.

8. The system of claim 7, wherein the payment network is configured to:

determine whether the merchant is registered; and append the link between the payment account and the event to the access data structure further in response to the merchant being registered.

9. The system of claim 7, wherein the merchant is an airline, and wherein the ticket content includes a number of tickets and a seat number for each of the tickets, whereby access to an airplane is permitted for one or more passengers consistent with the ticket content.

10. The system of claim 7, wherein the payment network is configured to, when the event is registered and the transaction is approved by the issuer of the payment account, generate the authorization reply transmitted to the merchant in response to the initial authorization request, said authorization reply including an 0120 ISO-standard message, the message including the confirmation code.

11. The system of claim 8, wherein the payment network is configured to, in response to the event not being registered or the merchant not being registered, transmit the authorization reply, as received from the issuer, to the merchant.

12. The system of claim 7, wherein the event includes an airplane flight; and wherein the ticket content includes a number of tickets and/or a seat assignment for each ticket.

13. The system of claim 7, wherein the payment network is further configured to, after transmitting the subsequent authorization reply, mark, in the access data structure, the link between the payment account and the event as used; and wherein the subsequent authorization reply includes an ISO-standard message having an access granted indication.

14. A system for use in facilitating access to events, through use of payment accounts, the system comprising:

a payment network computing device in communication with an issuer and configured to:

receive a first authorization request for a purchase of access to an event, the first authorization request including event content indicative of the event, ticket content, and payment content indicative of a payment account, wherein the first authorization request is specific to a merchant;

forward a first authorization reply for the first authorization request from an issuer of the payment account to the merchant, the first authorization reply including an indication of whether the purchase of the access is approved or declined;

in response to the first authorization reply indicating the purchase of the access is approved, determine whether the merchant is registered for linked access entry and whether the event is registered for linked access entry;

in response to the merchant and the event being registered for linked access entry, store, in memory, a link between the payment account and the event;

identify a second authorization request, from a point-of-sale (POS) device at a site of the event, as an access request for the event based on the second authorization request including a merchant category code (MCC) unidentified to any category of merchant, the second authorization request including the payment content;

identify, based on the payment content included in the second authorization request, the link in the memory between the payment account and the event for which access is requested;

based on the identified link, generate a second authorization reply, the second authorization reply including the ticket content and indicating access for a user at the POS device to the event, consistent with the ticket content included in the second authorization reply and without the user separately presenting additional user credentials; and transmit the second authorization reply to the POS device at the site of the event.

15. The system of claim 14, wherein the payment network computing device is further configured to:

in response to the merchant or the event not being are registered for linked access entry, pass the first authorization reply to the merchant without storing the link between the payment account and the event in the memory.

16. The system of claim 14, wherein the event includes an airplane flight; and wherein the ticket content includes a number of tickets and/or a seat assignment for each ticket.

17. The system of claim 14, wherein the payment network computing device is further configured to finalize the link in the memory upon clearing and/or settling of the purchase of the access by a payment network for the issuer of the payment account.

18. The system of claim 14, wherein the payment network computing device is configured to, after transmitting the second authorization reply to the POS device at the site of the event, mark, in the memory, the link to the indicated access as used.

19. The system of claim 18, wherein the second authorization reply includes an ISO-standard message having an access granted indication.

20. The system of claim 14, wherein the payment network computing device is further configured to append a confirmation code to the first authorization reply, prior to forwarding the first authorization reply with the confirmation code to the merchant; and wherein the confirmation code indicating the payment account as linked to the event.

21. The system of claim 14, wherein the payment network computing device is further configured to, after storing the link in the memory, notify the user, via an email or a short message service (SMS) message, that the link is available as a manner of accessing access the event.

\* \* \* \* \*